(12) United States Patent
Karlinger

(10) Patent No.: US 6,471,189 B2
(45) Date of Patent: Oct. 29, 2002

(54) ROBOT WITH EXTERNALLY POSITIONED PROTECTIVE HOSE

(75) Inventor: Stefan Karlinger, Augsburg (DE)

(73) Assignee: Kuka Roboter GmbH (DE)

(*) Notice: Subject to any disclaimer, the term of this patent is extended or adjusted under 35 U.S.C. 154(b) by 0 days.

(21) Appl. No.: 09/834,893

(22) Filed: Apr. 12, 2001

(65) Prior Publication Data

US 2001/0032973 A1 Oct. 25, 2001

(30) Foreign Application Priority Data

Apr. 15, 2000 (DE) .......................... 200 07 000

(51) Int. Cl.⁷ ............................................. B66D 1/00
(52) U.S. Cl. ........................................ 254/329; 254/394
(58) Field of Search ................... 254/278, 286, 254/329, 338, 394

(56) References Cited

U.S. PATENT DOCUMENTS 5,437,207 A * 8/1995 Zimmer ..................... 414/918
5,498,940 A    3/1996 Kim et al.
5,777,267 A    7/1998 Szydel
6,230,859 B1 * 5/2001 Springmann ............. 191/12 R

FOREIGN PATENT DOCUMENTS

| DE | 37 15 118 A1 | 11/1988 |
| DE | 40 18 435 A1 | 12/1991 |
| DE | 43 45 019 A1 | 7/1994 |
| DE | WO 97/39505 | 10/1997 |
| DE | WO 98/19090 | 5/1998 |
| JP | 2000167793 | 6/2000 |

* cited by examiner

*Primary Examiner*—Emmanuel M. Marcelo
(74) *Attorney, Agent, or Firm*—McGlew and Tuttle, P.C

(57) ABSTRACT

A robot with at least one at least partly externally positioned protective hose, particularly a cable guidance hose receiving robot tool supply cables has a winding guide located in the vicinity of a tool assembly flange for winding and unwinding the protective hose length necessary as a function of the tool positions.

20 Claims, 3 Drawing Sheets

ROBOT WITH EXTERNALLY POSITIONED PROTECTIVE HOSE

FIELD OF THE INVENTION

The invention relates to a robot with at least one at least partly externally positioned protective hose, particularly a cable guidance hose receiving a supply cable for robot tools.

BACKGROUND OF THE INVENTION

In the case of multiaxial robots with several parts swivellable relative to one another and in particular robot arms, in the case of robot movements spacing changes of the individual parts occurs, which must be taken into account especially in the case of at least partly externally positioned protective hoses for guiding supply cables for elements and mainly tools of the robot. The latter must on the one hand be in a position to take up length changes and on the other must be loaded or strained as little as possible during robot movements so as to ensure a high stability and prevent premature damage.

The palletizing robot has four active axes (three basic axes and one hand axis). The active hand axis is rotation axis A6. A5 is passive and is moved synchronously with A2 and A3 by a push rod 1A acting in an articulation 13. In order to ensure the cable guide length reserves necessary for taking up or absorbing length changes, it is e.g. known to guide the supply cables in essentially circular loops in the vicinity of the axes of the robot arms (DE 198 17 605) or to connect them to a robot hand by means of a rotary passage or duct. Whereas the latter is complicated and costly, the sole guidance of the supply cables in loops restricts mobility or swivellability of the robot, particularly the robot hand.

Therefore the problem of the invention in the case of a robot of the aforementioned type is to ensure an improved cable guidance which, as a result of a significant length reserve, does not impair robot mobility and simultaneously does not or only slightly strains the supply cables or the protective hose receiving the latter.

SUMMARY OF THE INVENTION

In the case of a robot of the aforementioned type this problem is solved according to the invention by a winding guide positioned in the vicinity of a tool assembly flange for winding and unwinding the protective hose length necessary as a function of tool movements.

As a result of the construction according to the invention with protective hose length changes caused by robot movements, said hose is not drawn in or tightened in uncontrolled manner, but is instead wound and unwound in controlled manner by rotating the winding guide. This leads to a substantially unrestricted freedom of movement of the robot and in particular a high rotation angle of the holding device for the tool, which e.g. permits a tool rotation by at least 270Ø in each direction. The protective hose loads and strains cause by tensile and compressive forces are reduced by the in particular frictional winding and unwinding with respect to the winding guide. Finally, robot compactness is increased, because the winding guide avoids the cable being wound in uncontrolled manner around the arm and hand during the rotation of A6, which is in particular problematical with large rotation angles.

In order to ensure a correct winding and unwinding of the protective hose when tool movements occur, preferably the winding guide has two substantially congruent, spaced disks, between which the protective hose is wound and in particular the disk spacing roughly corresponds to or slightly exceeds the protective hose thickness.

In a preferred construction the rotation axis of the winding guide is positioned parallel to the axis of a robot hand having the tool assembly flange and in particular is coaxial to the axis having the largest necessary swivel angle.

According to a preferred development, with the winding guide are associated guide rollers, which guide the protective hose at least along a robot arm articulated to the robot hand. Preferably there are two guide rollers guiding the protective hose substantially parallel to the robot arm and whereof one is mounted in the area of the robot axes located at the robot arm ends. The guide rollers are appropriately substantially parallel to the robot axes located on the robot arm and to which the robot arm is terminally articulated. This ensures a permanently close guidance of the protective hose along the robot, in that the hose, e.g. during tool movements, is wound over the winding guide and via the guide rollers follows at least along the robot arm articulated to the robot hand.

The protective hose is preferably guided in a loop around the robot axis of the robot arm remote from the robot hand and in this case preferably at least one guide element is provided guiding the protective hose in the circumferential direction of the robot axis of the robot arm remote from the robot hand and which can e.g. be constructed in the manner of a hollow cylinder receiving the hose.

To permanently ensure a close guidance of the protective hose on the robot arm, together with a completely satisfactory winding and unwinding of the protective hose by means of the winding guide, the protective hose is wound in loop form around the A3 axis and is preferably pretensioned in the winding direction. In a preferred development a return spring is provided for this purpose and can e.g. be located on the guide element for guiding the protective hose in the circumferential direction of the robot hand-remote robot axis of the robot arm articulated thereto. As a result of this construction the protective hose length reserves necessary for a satisfactory freedom of movement can be taken up by the winding guide by winding the hose.

BRIEF DESCRIPTION OF THE DRAWINGS

The invention is described hereinafter relative to a preferred embodiment and with reference to the attached drawings, wherein show.

DETAILED DESCRIPTION OF THE DRAWINGS

Figure 1:
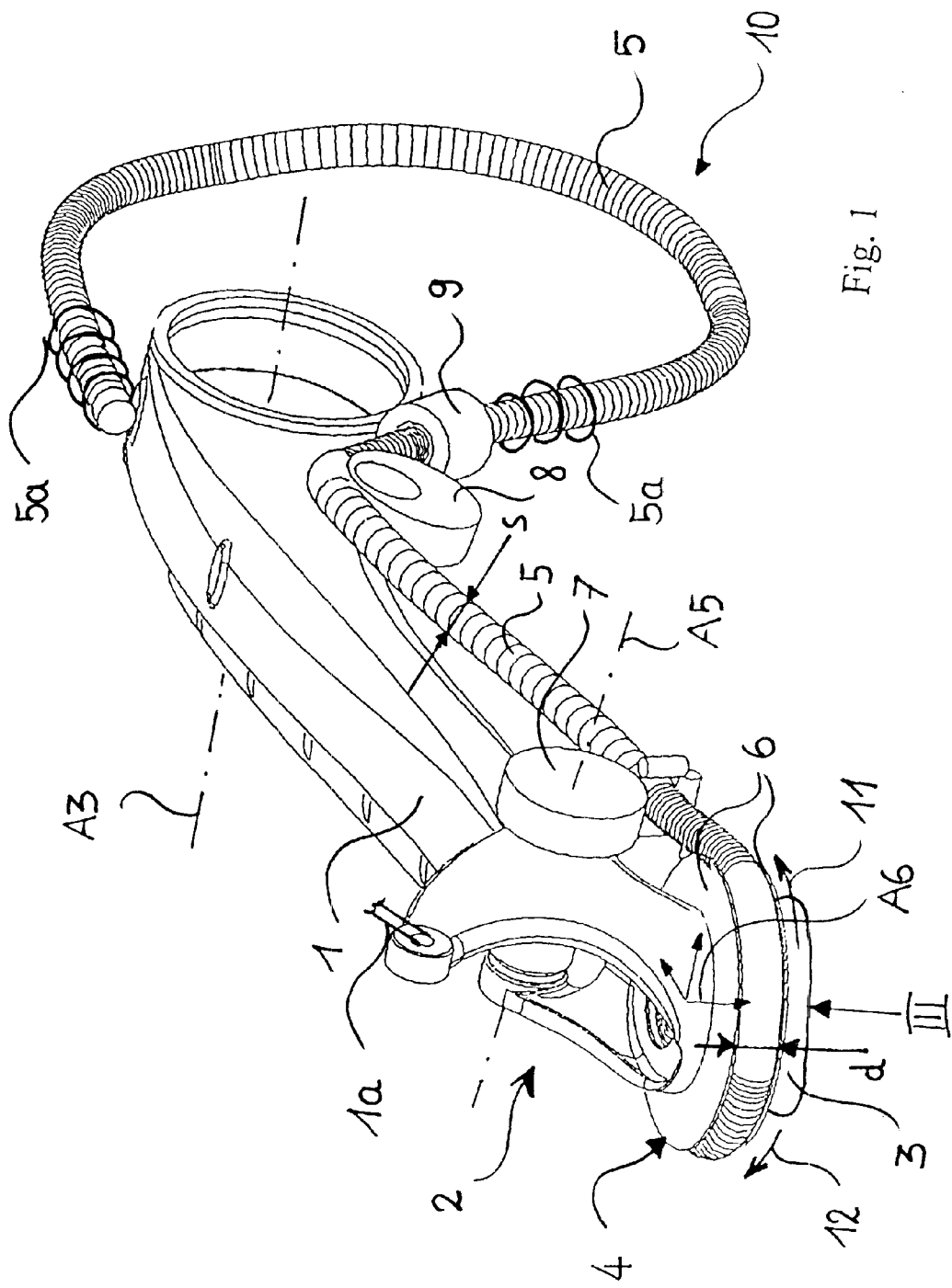
FIG. 1 A perspective view of a robot arm with a robot hand articulated thereto with a winding guide for a protective hose in the wound state.

FIG. 1 shows a robot arm 1 of a multiaxial industrial robot, e.g. a palletizing robot. The robot arm 1 has a robot hand 2 articulated to a terminal swivel axis A5. The robot arm 1 is e.g. articulated at its swivel axis A3 remote from the robot hand 2 to a not shown, further robot arm, which is in turn swivellable at its end remote from the robot arm 1 about a second, horizontal robot axis and is placed on a first robot base swivellable about a vertical axis, such as a carrousel (not shown). The robot hand 2 can be swivelled about an axis A5 and has a tool assembly flange 3 rotatable about the A6 axis for a not shown robot tool. For the power supply of the tool is provided a protective hose 5 guided externally along the robot arm 1 and which can be a cable guidance hose, which is received by a winding guide 4 positioned in the vicinity of the assembly flange 3 of the robot hand 2 for winding and unwinding the length of the protective hose 5 necessary as a function of the tool position. For the guidance of the protective hose 5 the winding guide 4 is equipped with two substantially congruent, spaced disks 6 between which the hose 5 is wound. The spacing of the disks 6 roughly corresponds to the thickness s of the protective hose 5. The length reserve is e.g. located in the loop with tension springs 5a located over the entire loop length. In the represented construction the rotation axis of the winding guide 4 corresponds to the rotation axis A6 of the robot hand 2.

At the ends the robot arm 1 has in each case a guide roller 7, 8 arranged coaxially or parallel to the swivel axes A3, A5 and which guides the protective hose 5 substantially parallel to and closely engaging with the robot arm. For laterally supporting the protective hose 5 on the guide rollers 7, 8 the latter are equipped with an e.g. substantially hemispherical circumferential groove roughly corresponding to the cross-section of the protective hose 5. The protective hose 5 is guided about the swivel axis A3 of the robot arm 1 remote from the robot hand 2 by means of a guide element 9 constructed in the manner of a hollow cylinder so as to provide a loop 10, which ensures the protective hose length reserve. The winding guide ensures a clearly defined cable guidance during the rotary movement around axis A5. Otherwise the cable wound wind in uncontrolled manner around the arm 1 and the hand 2, so that wear would occur, together with the risk of damage, accompanied by an increased space requirement. In order to always guide the protective hose 5 in closely engaging manner along the robot arm 1, the protective hose 5 is pretensioned in the unwinding direction 11 e.g. by means of not shown return springs located on the guide element 9.

Figure 2:
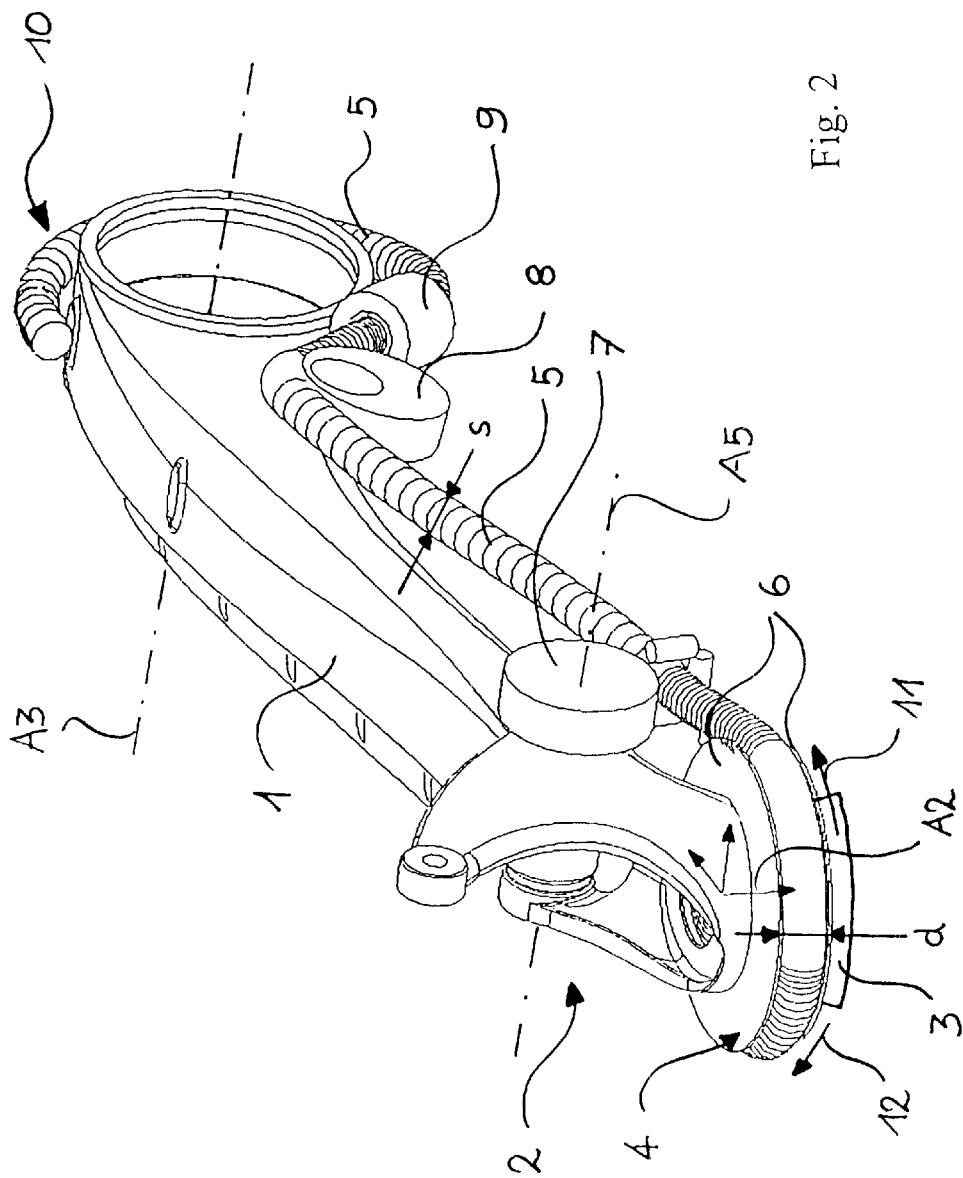
FIG. 2 The robot arm according to FIG. 1 with the protective hose in an at least partly unwound state.

In the robot position shown in FIG. 1 the protective hose 5 is substantially completely unwound from the winding guide 4. The loop 10 guided with clearance about the A3 axis represents the length reserve of the protective hose 5. If the hand flange is rotated in the winding direction 12, the hose is wound onto the winding device and the length reserve in the loop is tightened and applied. FIG. 2 shows the state with a completely wound winding device and the smallest possible loop 10. This ensures an unrestricted freedom of movement of the robot, particularly the tool, with a correct protective hose guidance. In addition, the protective hose is subject to minimum strain through the winding on and off the winding guide, which leads to a particularly long service life thereof.

Figure 3:
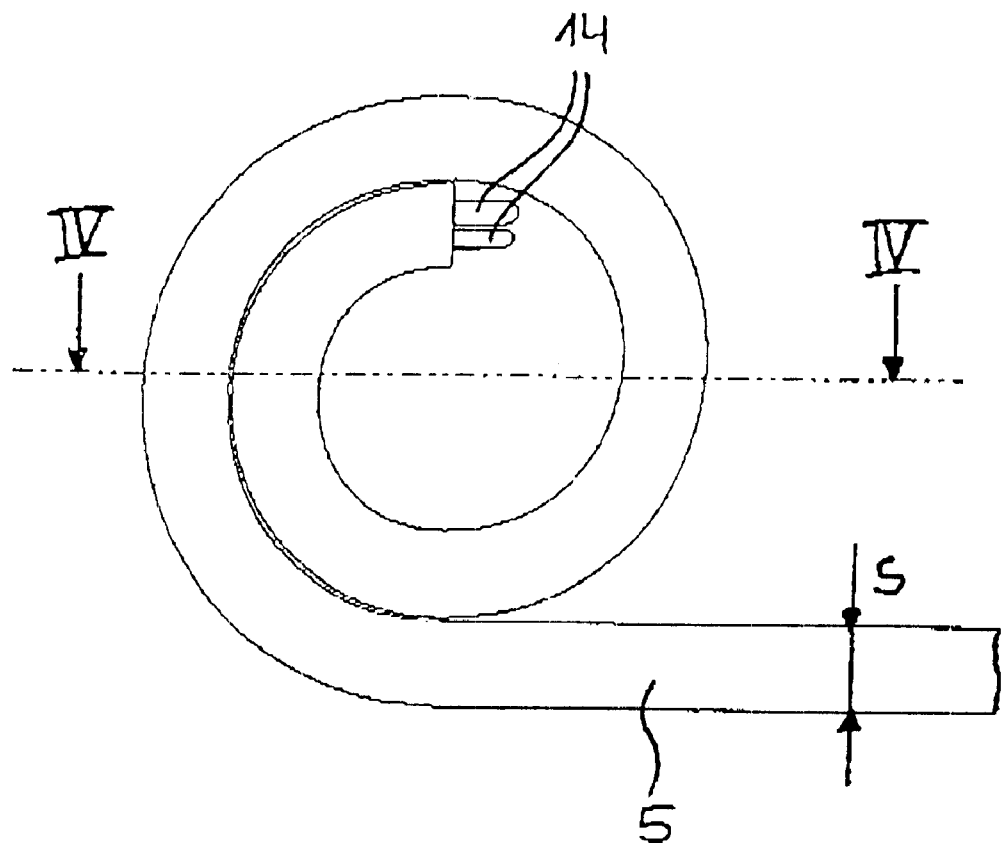
FIG. 3 A diagrammatic view of the protective hose in the direction of arrow III in FIG. 1.
Figure 4:
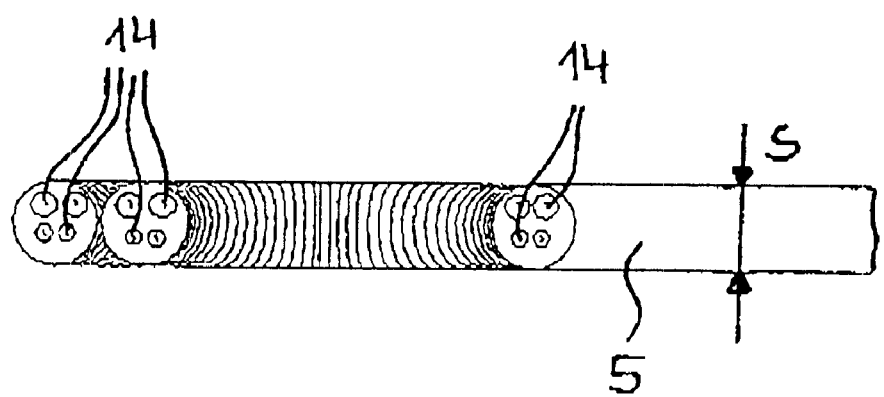
FIG. 4 A section IV—IV through the protective hose of FIG. 2.

FIG. 3 is a diagrammatic plan view of the protective hose 5 wound between the disks 6 of the winding guide 4 (FIG. 1), which in the construction shown constitutes a cable guidance hose for supply cables 14. FIG. 4 is a cross-section through the wound protective hose of FIG. 3.

REFERENCE NUMERALS

1 Robot arm
2 robot hand
3 holding device
4 winding guide
5 protective hose
6 disk
7/8 guide roller
9 guide element
10 loop
11 unwinding direction
12 winding direction
14 supply cable
d disk spacing
s protective hose thickness

I claim:

1. A robot arm for a multiaxial robot, the robot arm comprising:
   a robot hand having a rotational axis;
   at least one at least partially externally positioned protective hose, for receiving robot tool supply cables;
   a tool assembly flange provided at the robot hand;
   a winding guide disposed adjacent to the tool assembly flange for winding and unwinding the length of the protective hose as required as a function of the tool positions, said winding guide having a rotational axis that is parallel to said rotational axis of said robot hand.

2. A robot arm according to claim 1, wherein the winding guide has two substantially congruent spaced disks between which the protective hose is wound.

3. A robot arm according to claim 2, wherein the spacing of the disks substantially corresponds to or slightly exceeds a thickness of the protective hose.

4. A robot arm according to claim 1, wherein the rotation axis of the winding guide is coaxial with the rotation axes of the robot hand having the assembly flange.

5. A robot arm according to claim 1, further comprising a guide roller associated with the winding guide, said guide roller guiding the protective hose at least along a robot arm articulated to the robot hand.

6. A robot arm according to claim 5, wherein there are two guide rollers guiding the protective hose substantially parallel to the robot arm and in each case one of the two guide rollers is mounted in the vicinity of the robot axes positioned terminally on the robot arm.

7. A robot arm according to claim 5, wherein the guide rollers are mounted substantially parallel to the robot axes positioned on the robot arm.

8. A robot arm according to claim 1, wherein the protective hose is guided closely engaging on the robot arm.

9. A robot arm according to claim 1, wherein the protective hose is guided in a loop around the robot axis of the robot arm remote from the robot hand.

10. A robot arm according to claim 9, wherein there is at least one guide element guiding the protective hose in the circumferential direction of the robot axis of the robot arm remote from the robot hand.

11. A robot arm according to claim 10, wherein the guide element is constructed in the manner of a hollow cylinder receiving the protective hose.

12. A robot arm according to claim 1, wherein the protective hose is pretensioned in the unwinding direction.

13. A robot arm according to claim 12, wherein the protective hose is pretensioned by means of a return spring.

14. A robot arm according to claim 13, wherein the return spring is located on the guide element.

15. A robot arm arrangement for a multiaxial robot, the robot arm arrangement comprising:
   a robot arm;
   a robot hand connected to the robot arm for movement about a robot hand rotational axis;
   a tool assembly flange connected to said robot hand;
   a protective hose disposed externally of said robot hand and said robot arm, said protective hose for receiving robot tool supply cables;

a winding guide disposed adjacent to the tool assembly flange for winding and unwinding the length of the protective hose as required as a function of the tool positions, said winding guide having a rotational axis that is parallel to said robot hand rotational axis.

16. A robot arm according to claim 15, wherein the winding guide has two substantially congruent spaced disks between which the protective hose is wound and the spacing of the disks substantially corresponds to or slightly exceeds a thickness of the protective hose.

17. A robot arm according to claim 15, wherein the rotation axis of the winding guide is parallel and coincident to the rotation axes of the robot hand having the assembly flange.

18. A robot arm according to claim 15, further comprising guide rollers associated with the winding guide, said guide rollers guiding the protective hose at least along a robot arm articulated to the robot hand.

19. A robot arm according to claim 18, further comprising two guide rollers guiding the protective hose substantially parallel to the robot arm, said two guide rollers being mounted on the robot arm.

20. A robot arm arrangement for a multiaxial robot, the robot arm arrangement comprising:

robot arm;

a robot hand connected to the robot arm for movement about a robot hand rotational axis;

a tool assembly flange connected to said robot hand;

guides connected to said robot arm;

a protective hose disposed externally of said robot hand and said robot arm and connected to the guides, said protective hose for receiving robot tool supply cables; and a winding guide disposed adjacent to the tool assembly flange for winding and unwinding the length of the protective hose as required as a function of the tool positions, said winding guide having a rotational axis that is parallel to said robot hand rotational axis.

* * * * *